Nov. 23, 1937. R. F. PEO ET AL 2,099,750
GOVERNOR CLUTCH DRIVE MECHANISM SUPPORT
Filed Jan. 17, 1936 4 Sheets-Sheet 4
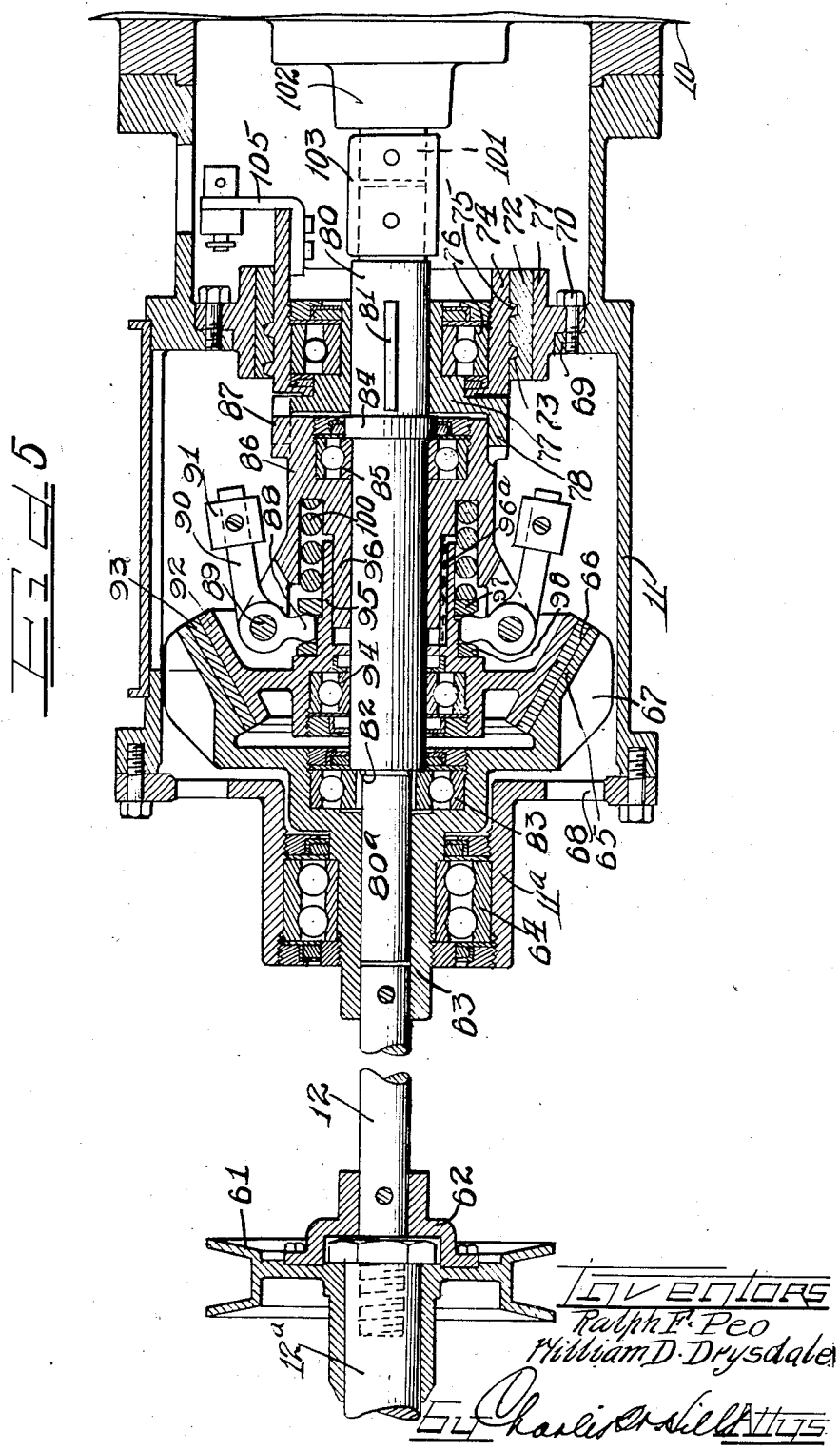
Inventors
Ralph F. Peo
William D. Drysdale
By Charles R. Hill Attys Patented Nov. 23, 1937

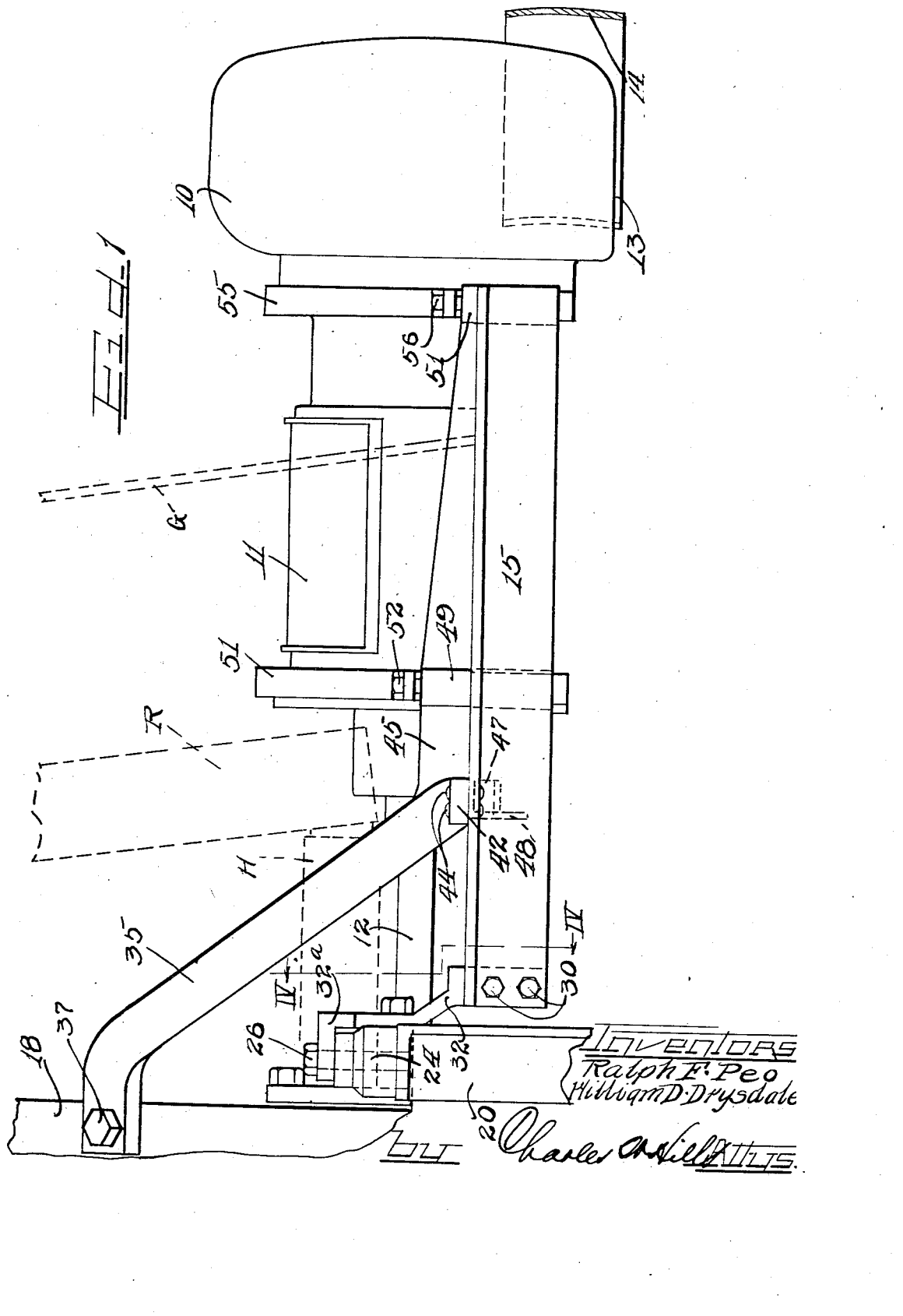

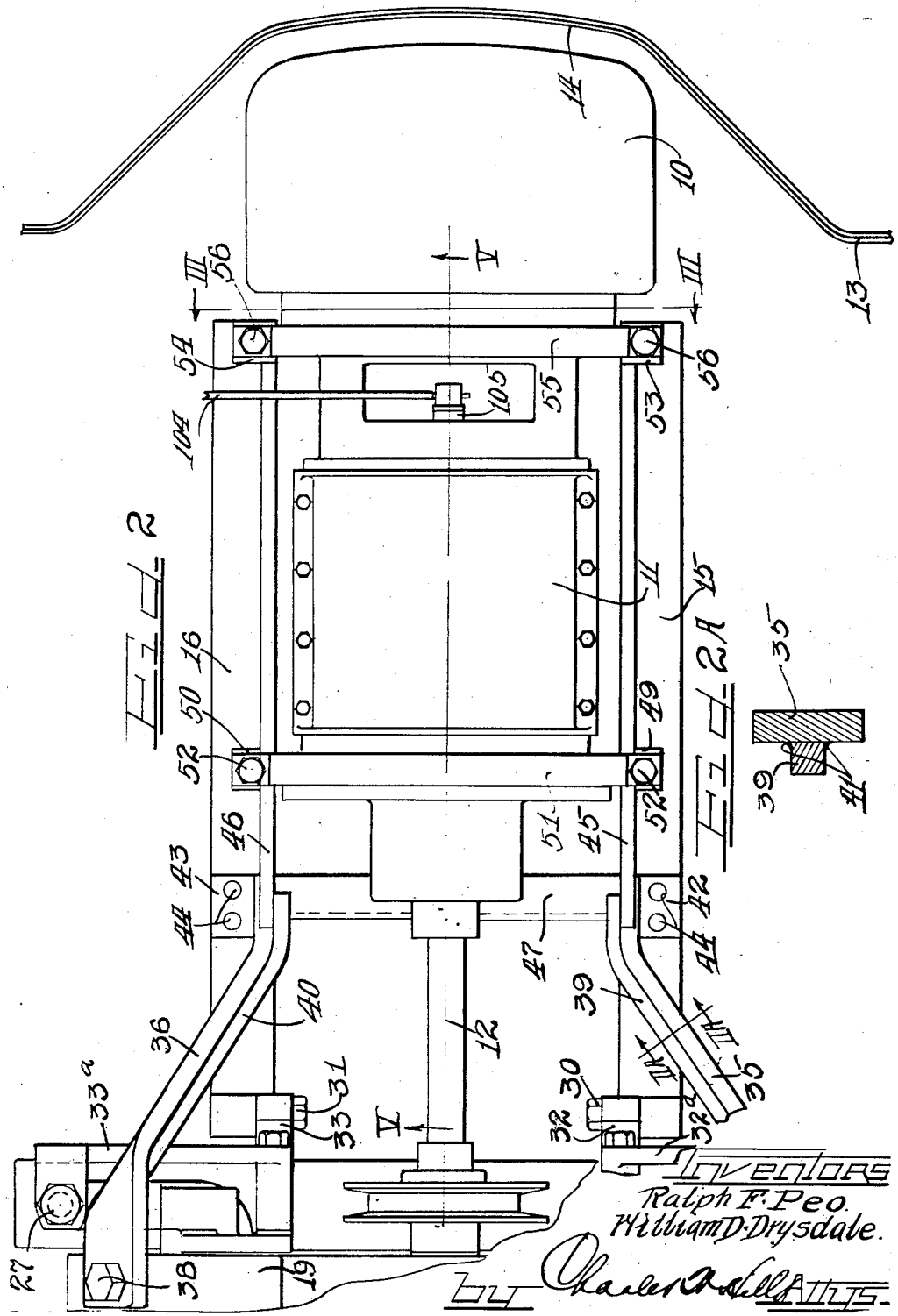

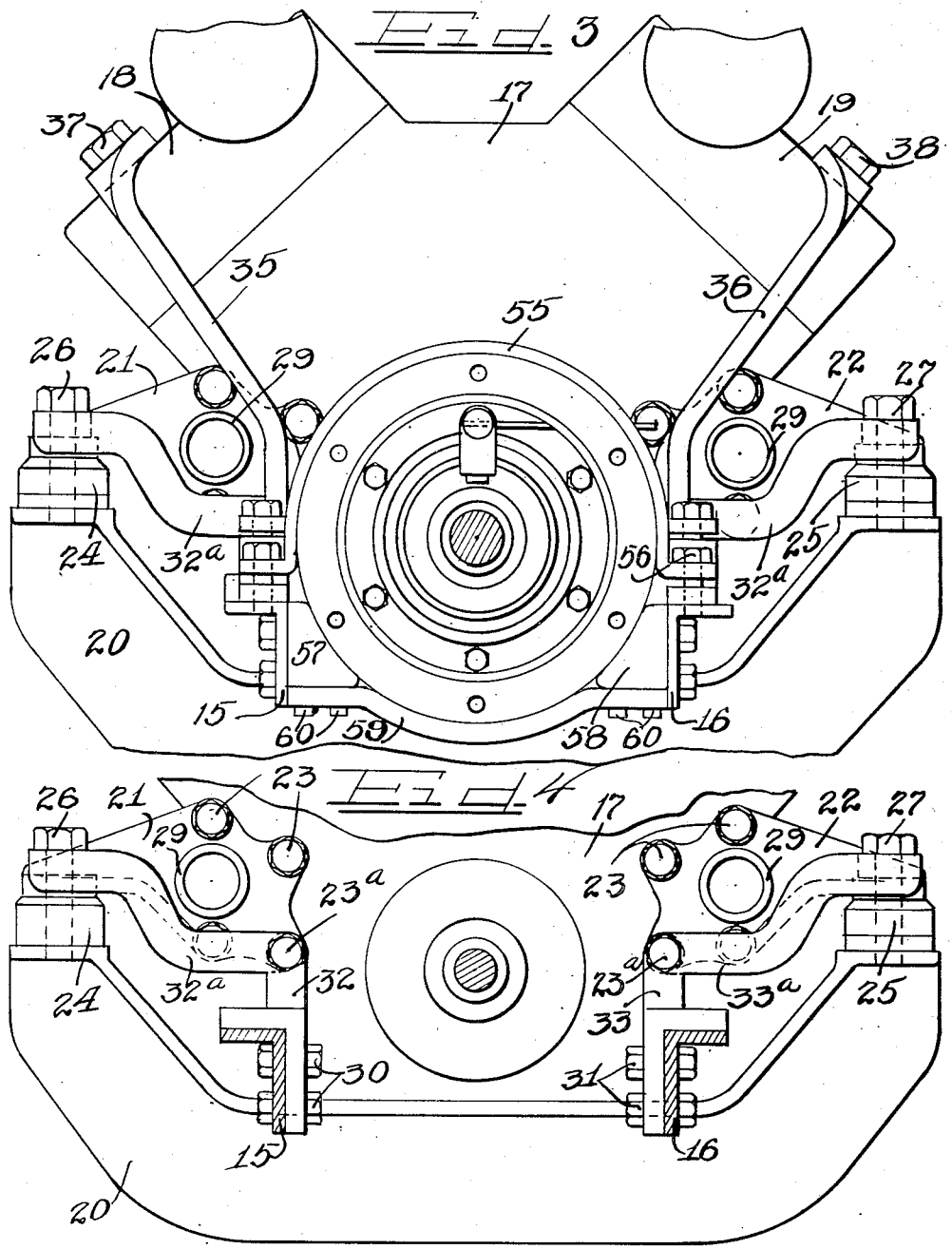

2,099,750

UNITED STATES PATENT OFFICE 2,099,750

GOVERNOR CLUTCH DRIVE MECHANISM SUPPORT

Ralph F. Peo and William D. Drysdale, Buffalo, N. Y., assignors to Houde Engineering Corporation, Buffalo, N. Y., a corporation of New York Application January 17, 1936, Serial No. 59,500

8 Claims. (Cl. 180—53)

This invention relates to the mounting of a compressor pump for automotive air conditioning systems on the front end of an automobile engine, and includes mechanism for driving the compressor.

More specifically, this invention relates to the supporting of a governor clutch drive mechanism from the front end of an internal combustion engine whereby the mechanism can be directly driven from the crankshaft of the engine.

In automotive air conditioning systems of the compressor-condenser-evaporator type, it is desirable to directly drive the compressor pump from the automobile engine without interfering with any of the other engine mechanisms and without necessitating the redesigning of standard equipment for automobiles.

According to this invention, a compressor pump for an automotive air conditioning system can be directly driven through a clutch mechanism from the crankshaft of the automobile engine and mounted in an out-of-the-way place in non-interfering relation to other mechanisms on the automobile. The compressor pump mechanism is mounted in a cradle or frame structure suspended as a unit from the front-end of the automobile engine and insulated from shocks by the engine mountings.

It is then an object of this invention to provide a suspension mounting for carrying auxiliary mechanism in front of an automobile engine.

Another object of this invention is to provide supporting frame structure for a compressor pump drive mechanism which structure is readily carried by an automobile engine.

A further object of this invention is to provide a suspension frame structure for an air conditioning unit on the front end of an automobile engine.

Another object of this invention is to suspend a compressor drive mechanism on the front end of an automobile engine without necessity of redesigning any of the engine parts.

A specific object of this invention is to provide an improved compressor pump drive mechanism for automobile air conditioning systems.

Other and further objects of this invention will become apparent from the following detailed description of the annexed sheets of drawings which form a part of this specification.

The invention is illustrated, in a preferred modification, on the accompanying drawings.

On the drawings:

Figure 1 is a side elevational view of a governor clutch drive mechanism and supporting frame therefor according to this invention.

Figure 2 is a top plan view of the drive mechanism and supporting structure therefor.

Figure 2A is a cross sectional view taken along the line IIA—IIA of Figure 2.

Figure 3 is an enlarged cross-sectional view, with parts in elevation, taken substantially along the line III—III of Figure 2.

Figure 4 is a broken cross-sectional view, with parts in elevation, taken substantially along the line IV—IV of Fig. 1.

Figure 5 is an enlarged cross-sectional view of the governor clutch mechanism taken substantially along the line V—V of Figure 2.

As shown on the drawings:

In Figures 1 and 2, the reference numeral 10 indicates the housing of a compressor pump for an automotive air conditioning system of the compressor-condenser-evaporator type. A centrifugal throw-out clutch is mounted in a housing 11 directly behind the housing 10 and is driven through a shaft 12 directly from the crankshaft of an automotive engine, as will be more fully hereinafter described. The compressor 10 is mounted behind the front bumper 13 of the automotive vehicle, which bumper is preferably bowed outwardly in the center thereof, as at 14, so as to be in spaced relation from the compressor 10 to protect the same. The housings 10 and 11 are carried between a pair of horizontally suspended angle bars 15 and 16, as will be hereinafter described.

As shown in Figures 3 and 4, the reference numeral 17 indicates the block of an internal combustion chamber of the V-type having cylinder heads 18 and 19, respectively. The block 17 is carried, as is customary, on a cross-member 20 of the automobile frame and is suspended at the front end thereof by members 21 and 22 which are bolted onto the block 17 as by means of bolts 23. The members 21 and 22 rest on rubber bushings 24 and 25, respectively, and are secured to the cross-member 20 by bolts 26 and 27 threaded into the cross-member 20 and extending through the rubber bushings 24 and 25, respectively.

The engine block 17 is therefore resiliently mounted in the frame of the automobile, as is customary, on a cross-member of the frame. While a V-type engine block has been shown, it should, of course, be understood that this invention is adapted to be mounted on any type of automotive engine.

The supporting brackets 21 and 22 are apertured, as at 29, and are thus adapted to receive therethrough auxiliary shafts, such as, for example, pump shafts or the like. These supporting brackets are intended only to illustrate a standard manner of mounting an engine in an automobile frame, and it is obvious that other types of mountings can be used, as the automobile engine mounting forms no part of this invention.

According to this invention, however, the ends of the angle bars 15 and 16 are bolted, as at 30 and 31, respectively, to brackets 32 and 33, respectively, having laterally extending arms 32a and 33a, respectively, integral therewith, extending in front of the supporting plates 21 and 22 and disposed over the rubber bushings 24 and 25, respectively, with the plates 21 and 22. The ends of the arms 32a and 33a can thus be mounted on the cross-member 20 by the same bolts 26 and 27 used in mounting the engine 17 to the cross frame member. The brackets 32 and 33 can furthermore be secured to the plates 21 and 22, respectively, by bolts such as 23a also used in securing these supporting plates to the engine cylinder block.

In this manner, the horizontally extending bars 15 and 16 are suspended from the front end of the engine and are resiliently mounted with the engine mounting without redesigning any of the engine parts.

In order to hold the angle bars 15 and 16 in horizontal position, a pair of straps 35 and 36 are bolted to the heads 18 and 19 of the cylinder block 17 by means of the usual head bolts, such as 37 and 38. The supporting straps or braces 35 and 36 are reinforced by bars 39 and 40 welded or brazed to the central portion of the backs thereof, as indicated at 41 in Figure 2A. The ends of the braces 35 and 36 are welded or brazed to blocks 42 and 43, respectively, which in turn are riveted to the angle members 15 and 16 by means of rivets, such as 44.

Additional reinforcing strips 45 and 46 are welded or brazed to the ends of the braces 35 and 36, respectively, and as shown in Figures 1 and 2, extend along the full lengths of the angle bars 15 and 16 along the top inner edges of the bars. The strips 45 and 46 are integrally welded to the ends of the braces 35 and 36 over a considerable area thereof, as shown in Figure 1, so as to provide a rigid reinforcing suspension from the braces. A cross-brace 47 extends between the angle bars 15 and 16 under the shaft 12 and is preferably bowed down in the center thereof, as indicated at 48 in Figure 1. This cross-brace 47 is brazed or welded, at the ends thereof, to the angle bars along the vertical flanges thereof.

Blocks 49 and 50 are brazed to the reinforcing bars 45 and 46, as shown in Figure 2, and these blocks 49 and 50 can also be brazed or welded to the horizontal flanges of the angle bars 15 and 16. The blocks 49 and 50 are adapted to receive thereover the ends of a retainer band 51, which band is bolted to the blocks by means of bolts 52 extending therethrough and threaded into the blocks. The band 51 extends up around the housing 11 of the centrifugal throw-out clutch to hold the housing in position on the framework.

Likewise, another pair of blocks 53 and 54 can be brazed or welded to the reinforcing bars 45 and 46 at the ends thereof for receiving the ends of another holding band 55 for securing the housing 10 of the compressor pump to the frame structure. The band 55 is bolted to the blocks 53 and 54 by means of bolts 56.

Beneath the bands 51 and 55, there are positioned bearing blocks, such as 57 and 58 (Figure 3), which can be welded to the vertical flanges of the angle bars 15 and 16 and which are provided with inner faces of the same contour of the housings 10 and 11, respectively, for supporting these housings. In addition, retainer bands, such as 59, are bolted to the bottom of the blocks 57 and 58, as shown in Figure 3, by means of bolts 60.

This structure therefore provides a rigid support for the mechanisms in the housings 10 and 11 and furthermore makes possible the mounting of these mechanisms in an out-of-the-way position.

As shown in dotted lines in Figure 1, the radiator R of the automotive vehicle is positioned above the shaft 12, and is connected with the engine through the usual hose connection H. A grille or screen G may be disposed in front of the radiator R as is customary. This grille G is cut away at the bottom central portion thereof to permit the passage of the housing 11 therethrough.

As shown in Figure 5, the housing 11 contains the governor clutch mechanism for driving the compressor pump at a speed below a predetermined maximum irrespective of the speed of the automobile engine. In Figure 5, the reference numeral 12a indicates the end of the crankshaft of the automobile engine having secured thereon the usual fan belt pulley 61. According to this invention, the pulley 61 receives a bushing 62 thereon to which the shaft 12 is pinned. The shaft 12, in turn, is pinned to the clutch member 63 of the governor clutch mechanism. This member 63 is rotatably mounted in a bearing 64 in a reduced portion 11a of the housing 11 and contains an enlarged portion 65 in the housing 11 proper. This portion 65 has a conical-shaped inner face 66 for a purpose to be hereinafter described and is also provided with fan blades 67 along its outer periphery for circulating air through openings 68 provided in the housing to cool the mechanism in the housing 11.

The rear portion of the housing 11 is provided with an inturned annular flange 69 to which is bolted, by means of bolts 70, a boss 71 having a liner sleeve 72 composed of a bearing metal. The sleeve 72 is internally threaded as at 73 for receiving a cylindrical housing member 74 having external threads 75 in engagement with the threads 73 of the sleeve 72. The housing 74 carries a bearing 76 which rotatably supports a jaw clutch member 77 having teeth 78 for a purpose to be hereinafter described.

A shaft 80 is carried in the jaw clutch member 77 and is slidably keyed to the member 77 through an elongated keyway 81. The other end of the shaft 80 is provided with a reduced portion 80a rotatably mounted in the clutch member 63 at the other end of the housing. A shoulder 82 is thus formed between the reduced portion 80a and the main shaft 80 against which a thrust bearing 83, carried by the member 63, is mounted.

The shaft 80 is also provided intermediate its ends with a collar 84 for abutting another thrust bearing 85 seated in a sleeve member 86 rotatably mounted on the shaft 80 and having teeth 87 formed on one end thereof for meshing with the teeth 78 of the jaw clutch member 77. The member 86 has clutch fingers 88 pivoted thereon by means of pins 89. The fingers have forwardly extending arms 90 carrying weights 91 in adjustable relation thereon for a purpose to be hereinafter described.

A conical faced driven clutch member 92 is provided with friction material 93 around its conical face for engaging the conical surface 66 of the enlarged portion 65 of the driving clutch member 63. The conical-shaped driven clutch member 92 is rotatably mounted on the shaft 80 on a bearing 94 and is provided with a cylindrical portion 95 adapted to slide over a portion 96 of the member 86. The portions 95 and 96 are slidably keyed together by a key 96a.

Collars 97 and 98 are disposed over the cylindrical portion 95 of the member 92 for abutting the fingers 88 carried on the member 86. A coiled spring 100 is held under compression between the member 86 and the collar 97 thereby sliding the portion 95 along the portion 96 of the member 86 to hold the member 92 in engagement with the portion 65 of the driven member 63. The member 86 is thus driven by the member 63 through the clutch member 92 and the key connection between the portion 95 of the member 92 and the portion 96 of the member 86 to rotate therewith and to drive the jaw clutch member 77 when the same is engaged. Since the jaw clutch member 77 is keyed to the shaft 80, it is obvious that the shaft 80 must rotate therewith to drive the drive shaft 101 of the compressor pump 102 in the housing 10. The shaft 80 is coupled with the drive shaft 101 of the compressor pump by a coupling 103.

When the member 86 is rotated beyond a predetermined speed, the weights 91 on the arms 90 of the fingers 88 fly outwardly to move the fingers backward and compress the spring 100, thereby relieving the tension against the member 92 and permitting the same to become disengaged from the portion 65 of the driving member 63. This arrangement provides a centrifugal throw-out whenever the driving member is driven beyond a predetermined speed as determined by the position of the weights 91 on the arms 90. When the speed of the driven member 92 falls below the predetermined maximum, the weights 91 drop by gravity toward the sleeve member 86, thereby permitting the coiled spring 100 to slide the member 92 into engagement with the driving member. This action occurs intermittently whenever the engine speed is above a predetermined maximum for the desired speed of rotation of the compressor pump.

In the event that it is desired to disengage the compressor pump from the engine drive, the jaw clutch member 77 can be disengaged from the member 86 through a Bowden wire control 104, as shown in Figure 2. By moving the wire 104, the arm member 105 carried by the housing 74 of the jaw clutch member is rotated to screw the housing 74 in the sleeve 72 for moving the teeth 78 of the jaw clutch member 77 out of engagement with the teeth 87 formed in the end of the member 86. Since the member 86 is thus rotated freely around the shaft 80 on the bearings 85 and 94, it is obvious that this member will not drive the shaft, and therefore the shaft 101 of the compressor pump 102 will not be driven when the jaw clutch member 77 is manually disengaged. The Bowden wire control can be conveniently threaded back to the dashboard of the automotive vehicle, if desired, to permit a manual control of the operation of the compressor pump within convenient reach of the driver of the vehicle.

From the above description, it should be understood that this invention provides for the direct suspension of a governor clutch mechanism and compressor pump from the front end of an automotive engine in an out-of-the-way position and at the same time permitting a direct drive for the mechanism from the crankshaft of the engine.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. In a motor-propelled vehicle having a radiator at the front end thereof, a motor resiliently mounted on said vehicle behind the radiator, a frame structure in front of said radiator, means for supporting said structure entirely from said motor, mechanism carried by said frame structure, and means for driving said mechanism directly from the crank shaft of the engine.

2. In combination, a vehicle, an internal combustion engine resiliently mounted on said vehicle for driving the vehicle, a frame structure extending from the front of the engine, means for supporting said structure entirely from the engine, mechanism carried by said frame structure, and means for operatively connecting said mechanism directly to the crank shaft of the engine to be driven thereby.

3. In combination with an automotive vehicle, a motor for driving said vehicle resiliently mounted on the vehicle, a supporting frame suspended from the front end of the motor, mechanism carried by said frame in alignment with the drive shaft of the motor, and means connecting said mechanism with the drive shaft to be driven thereby.

4. In combination with an automotive vehicle, a resilient motor mounting on said vehicle, a motor on said mounting, a frame structure extending from the front end of the motor of said vehicle, means for suspending the end of said frame structure from the motor mounting of the vehicle, and means for holding the frame structure in horizontal position suspended from the head of the motor.

5. In combination with a motor-propelled vehicle having a motor resiliently mounted on the frame of the vehicle, an auxiliary frame structure extending from the front end of the motor, a support for said structure suspended from the resilient motor mounting, and additional supports for said auxiliary structure suspended from the motor head.

6. In combination with a motor propelled vehicle having a radiator at the front end thereof and a front bumper in spaced relation from the radiator, a compressor pump and driving clutch therefor mounted between the radiator and bumper, a supporting frame for said pump and clutch and means for suspending the frame entirely from the front end of the motor.

7. In combination, a vehicle, a motor mounted on said vehicle for driving the same, a radiator on said vehicle in front of said motor, a frame structure extending forwardly from the front of the motor beneath the radiator and means for rigidly supporting said frame structure entirely from the motor.

8. In combination, a vehicle frame, a motor mounted on said vehicle frame, an auxiliary supporting frame comprising a pair of spaced beam members, cross members holding said beam members in fixed relation, brackets secured to one end of said beam members and attached to the front of the motor and straps secured to said beam members intermediate the ends thereof and attached to the top of the motor.

RALPH F. PEO.
WILLIAM D. DRYSDALE.